Oct. 12, 1965  E. R. GILMORE  3,210,998
FLUID FLOW MEASURING APPARATUS
Filed March 17, 1961  7 Sheets-Sheet 1

INVENTOR
EDWARD R. GILMORE

BY
*Strauch, Nolan & Neale*
ATTORNEYS

Oct. 12, 1965     E. R. GILMORE     3,210,998
FLUID FLOW MEASURING APPARATUS
Filed March 17, 1961     7 Sheets-Sheet 2

FIG. 2.

INVENTOR
EDWARD R. GILMORE

BY
Strauch, Nolan & Neale
ATTORNEYS

Oct. 12, 1965  E. R. GILMORE  3,210,998
FLUID FLOW MEASURING APPARATUS
Filed March 17, 1961  7 Sheets-Sheet 3

INVENTOR
EDWARD R. GILMORE
BY
Strauch, Nolan & Neale
ATTORNEYS

FIG.6.

INVENTOR
EDWARD R. GILMORE

Oct. 12, 1965  E. R. GILMORE  3,210,998
FLUID FLOW MEASURING APPARATUS
Filed March 17, 1961  7 Sheets-Sheet 6

INVENTOR
EDWARD R. GILMORE

BY Strauch, Nolan & Neale
ATTORNEYS

Oct. 12, 1965  E. R. GILMORE  3,210,998
FLUID FLOW MEASURING APPARATUS
Filed March 17, 1961  7 Sheets-Sheet 7

INVENTOR
EDWARD R. GILMORE
BY
Strauch, Nolan & Neale
ATTORNEYS

United States Patent Office 3,210,998
Patented Oct. 12, 1965

3,210,998
FLUID FLOW MEASURING APPARATUS
Edward R. Gilmore, Russellville, Ark., assignor, by mesne assignments, to Rockwell Manufacturing Company, Pittsburgh, Pa., a corporation of Pennsylvania
Filed Mar. 17, 1961, Ser. No. 96,494
4 Claims. (Cl. 73—266)

This invention pertains to apparatus for measuring the flow of fluids, and particularly to such apparatus used in measurement of quantities of gaseous fluids consumed for industrial and residential heating and the like.

Prior apparatus of the type just mentioned has been unnecessarily cumbersome, with an excessive number of moving parts which have led to inaccuracies in the measurements of fluid flow. In accordance with the present invention, the overall size of the apparatus is reduced, there are fewer moving parts than in prior art constructions, and the accuracy has thereby been increased and the manufacturing cost substantially reduced.

In accordance with one object of the present invention the apparatus is characterized by the provision of two expansible bellows devices positioned within a casing which serves as a third container for the fluids being measured. According to another feature and object of the invention, the bellows devices are set to act in directions which are at an angle to one another, thereby permitting a single crank throw on a crank shaft device which operates a valving means and which also operates an index for showing the quantity of fluid which has passed through the apparatus and measured.

Figure 18:
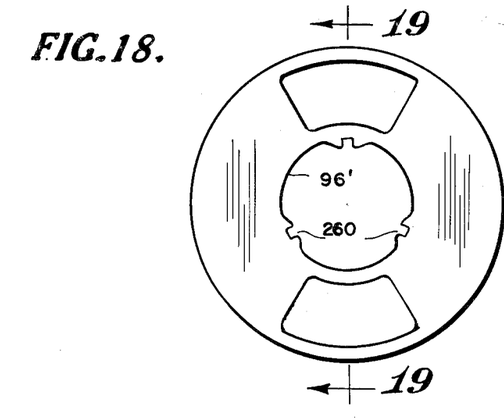
FIGURE 18 shows a bottom plan view of a modified valve useful in the illustrative embodiment described in the preceding figures.
Figure 19:
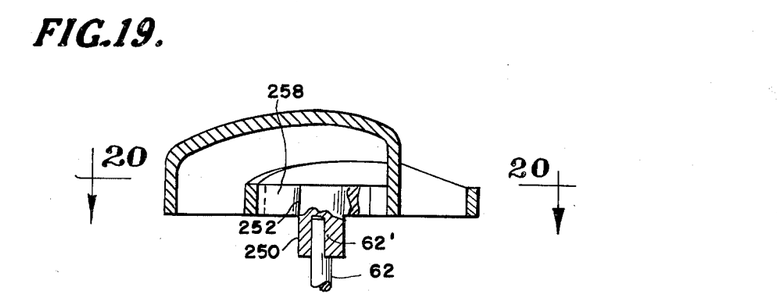
FIGURE 19 shows a cross-sectional view of the valve of FIGURE 18, taken substantially along the line 19—19 of FIGURE 18.
Figure 20:
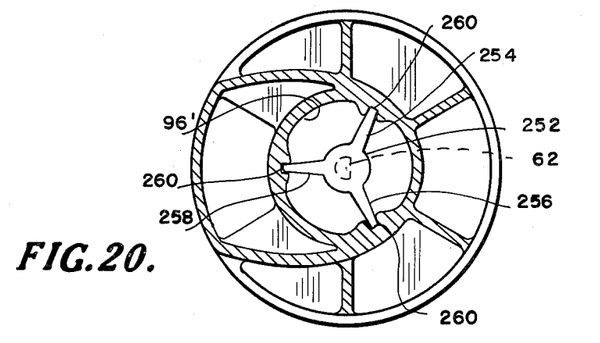
FIGURE 20 shows a top plan view partially in section of the valve of FIGURE 18 and 19, taken substantially along the line 20—20 of FIGURE 19.

Further objects and the entire scope of the invention will become apparent from the following detailed description of an illustrative embodiment and from the appended claims. The illustrative embodiment may be best understood by reference to the accompanying drawings, wherein:

The respective FIGURES 1–17 of the drawings pertain to but a single illustrative embodiment and the same parts are given the same reference characters in all of the figures. FIGURES 18–20 show a modified valve.

In terms of general organization of parts, the apparatus of the present invention may be said to consist basically of a casing 10, a cover 12 and a valve plate structure 14. The casing 10 is provided with a flange 16 running completely about its periphery. The cover 12 has a complementary flange 18. A plurality of screws 20 and apertures adapted therefor in the flanges 16 and 18 serve to fix the cover 12 to the casing 10, with a suitable gasket 22 existing therebetween. The flange 16 of the casing 10 extends inwardly a sufficient distance to also provide a platform upon which the peripheral edge 24 of the valve plate structure 14 may rest, and still other screws passing through apertures such as 26 in the edge or flange 24 of the valve plate structure may be employed to attach the valve plate structure to the casing 10, this connection also having a portion of the gasket 22 therebetween.

The cover member 12 is provided with two threaded nipples which establish communication through the outer surface of the cover, one of these being an inlet nipple 27 and the other being an outlet nipple 28. The inlet nipple 27 is simply terminated on the inside surface of the cover member 12 so that fluid moving inwardly through the nipple 27 may be said to flood the general cover chamber defined by the cover 12 and the valve plate member 14. However, the outlet nipple 28 is aligned with a circular skirt structure 30 (FIG. 1) which, when the cover is placed in position with respect to the valve plate structure, has a lower edge 32 which engages a resilient gasket 34 which is seated in an annular groove 36 in a portion of the valve plate structure 14. Inwardly of groove 36 is an aperture 38 which communicates with a channel 40 which leads to a valve to be described in detail hereinbelow.

Figure 6:
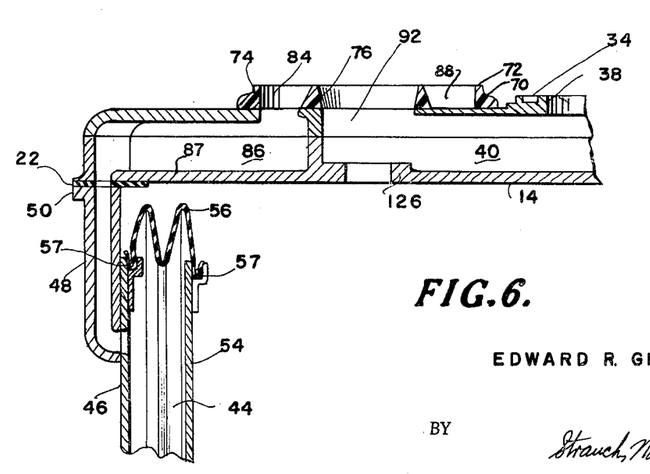
FIGURE 6 shows a sectional view of a fragment of the valve plate member of FIGURES 4 and 5, taken substantially along the line 6—6 of FIGURE 4.

Supported from the valve plate structure 14 are two bellows devices, one indicated generally by reference character 42 and the other by reference character 44. Both of these bellows devices are similar in construction, each having an outer plate 46 (FIG. 6) which is formed with a conduit 48 leading to a flange 50 which engages the valve plate structure 14 through a portion of previously mentioned gasket 22. Screws 52 (FIG. 5) may be employed to fix the conduit members 48 to the valve plate structure 14. Each bellows device is further characterized by an inner circular plate 54 (FIG. 6), the plates 46 and 54 being interconnected by a resilient tire 56 having convolutions as best shown in FIGURE 6. Any suitable means, such as cementing or binding by wire 57 into grooves on the peripheries of plates 46 and 54, may be provided for effecting a fluid-tight joint between the plates 46 and 54, and the two edges of the resilient tire 56. Centrally of the inner plates 54 of each bellows device is a universal joint 58 (FIGS. 1 and 5) to which a connecting rod 60 is attached. The connecting rods extend to a common crank arm described in detail hereinbelow, which is employed to rotate a drive shaft 62 which drives a valve 64 and also drives an index mechanism 66, all in a manner to be described in more detail hereinbelow.

It may be stated at this point that in respect to fluid entering the inlet nipple 27, the valve plate structure 14 is such as to prevent the flow of fluid beneath this valve plate structure and into the interior of casing 10, except for a single entry port 68 (FIGS. 2, 3, 4 and 5). As will appear hereinbelow, port 68 is alternately caused to be in communication with the inlet 27 and with the outlet 28 by rotary movement of the valve 64. Rotary movement of the valve 64 also causes alternate communication of each of the bellows devices with the inlet and the outlet. Thus it is that the apparatus in accordance with this invention is a three-chamber one, wherein the interior of bellows device 42 is a first chamber, the interior of bellows device 44 is a second chamber, and the interior of casing 10 is a third chamber.

Figure 2:
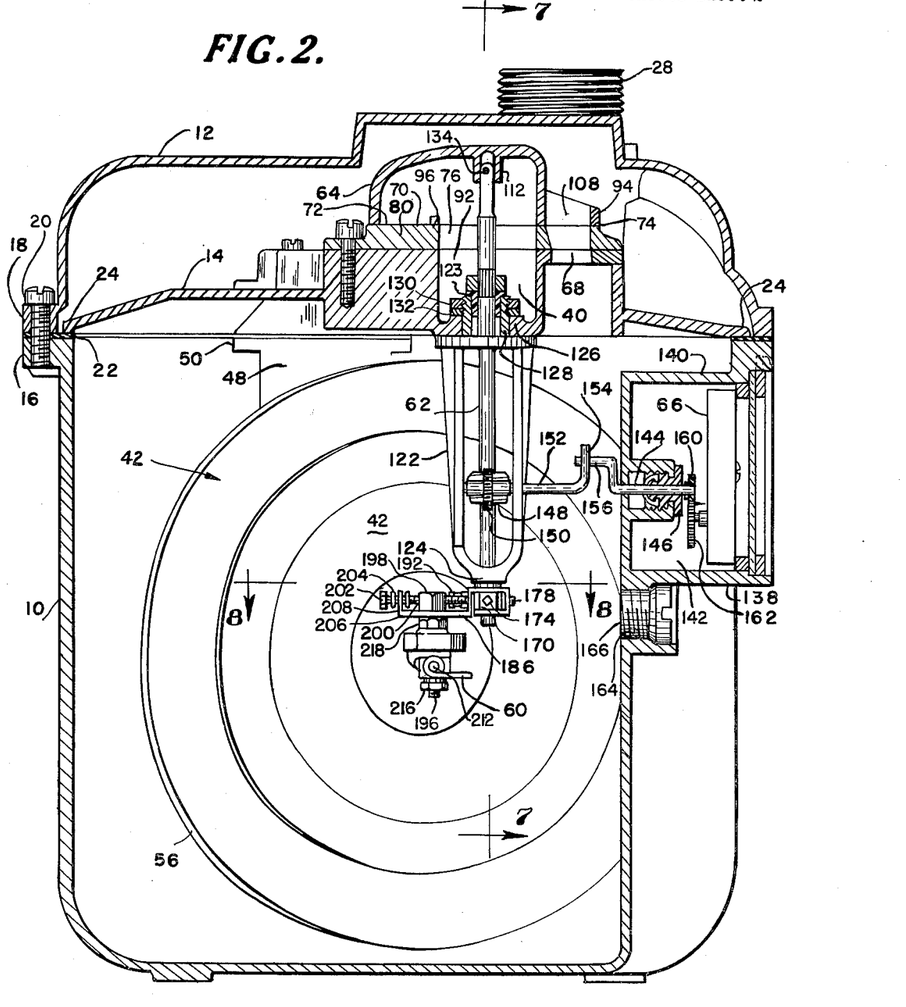
FIGURE 2 shows a section taken substantially along the line 2—2 of FIGURE 1: see also line 2—2 of FIGURE 4.
Figure 3:
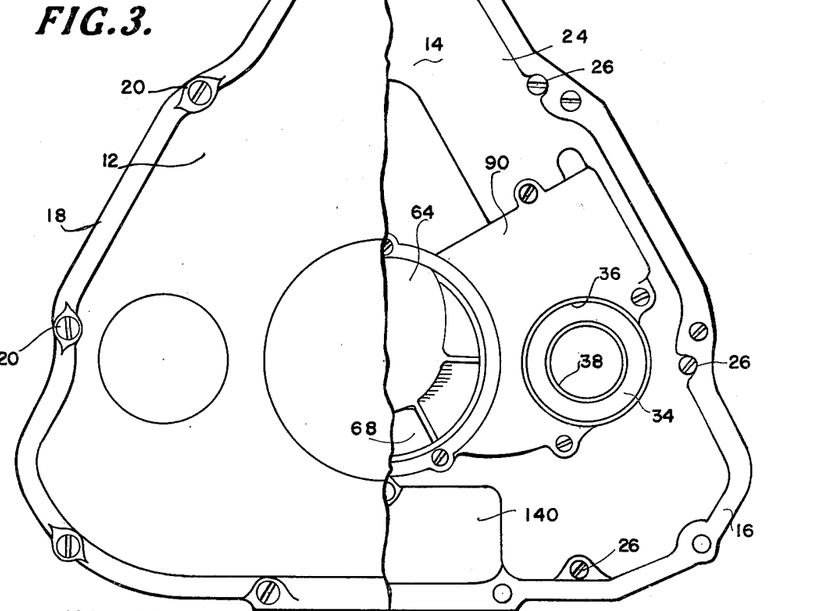
FIGURE 3 shows a top plan view with a cover member partially cut way.
Figure 4:
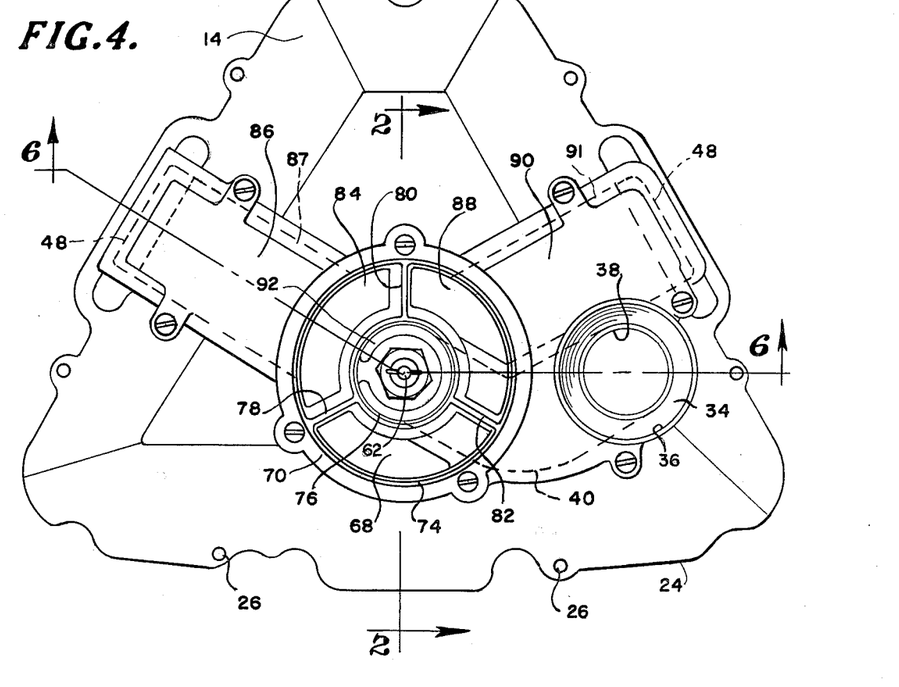
FIGURE 4 shows a top plan view of a valve plate member.
Figure 5:
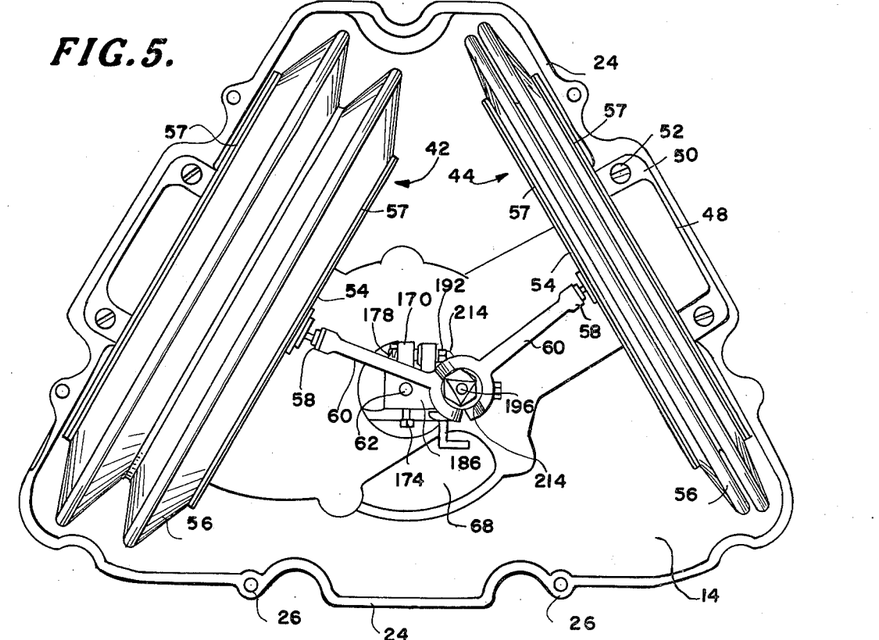
FIGURE 5 shows a bottom plan view of the valve plate member of FIGURE 4.

The valve 64 rides upon a valve seat structure 70, the inter-face between valve 64 and seat structure 70 being at 72 in FIGURES 2 and 6. The valve seat 70 in plan view (FIG. 4) shows a cylindrical side wall 74, a central cylindrical side wall 76, and at three positions spaced 120° apart are radial partitioning walls 78, 80 and 82, located with respect to the total apparatus as shown in FIG. 4. Between the partitioning walls 78 and 82 of the valve seat structure exists the previously mentioned port 68. Between partitioning walls 78 and 80 is a port 84 which communicates with bellows device 44 through a member 86 which forms a conduit 87 which communicates with the conduit 48 of the bellows device 44. Between the radial partitioning walls 80 and 82 of the valve seat structure is a port 88 which communicates with the bellows device 42 through a member 90 which forms a conduit 91 which communicates with the conduit 48 of the said bellows device 42.

The zone within the inner cylindrical wall 76 of the valve seat structure constitutes a port 92 which further communicates with the conduit 40 leading to the outlet nipple 28 through the aperture 38 as shown in FIGURE 4.

Figure 11:
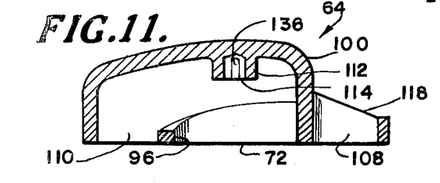
FIGURE 11 shows a side sectional view of the valve of FIGURES 9 and 10.
Figure 12:
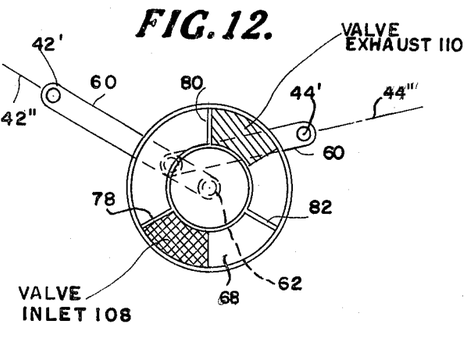
FIGURE 12 is a diagrammatic illustration of the apparatus in a first point of its operating cycle.
Figure 13:
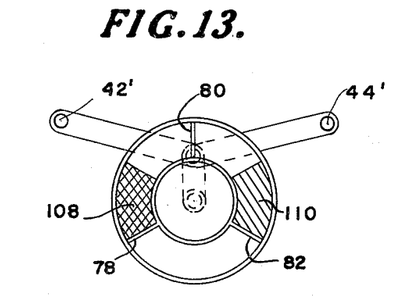
FIGURE 13 is a diagrammatic illustration of the apparatus in a second point of its operating cycle.
Figure 14:
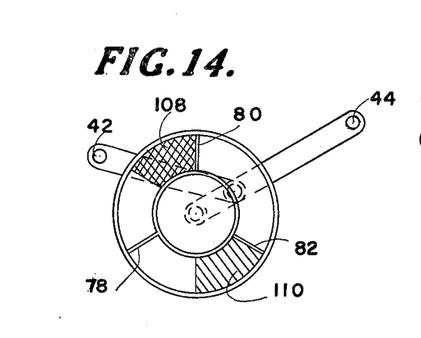
FIGURE 14 is a diagrammatic illustration of the apparatus in a third point of its operating cycle.
Figure 15:
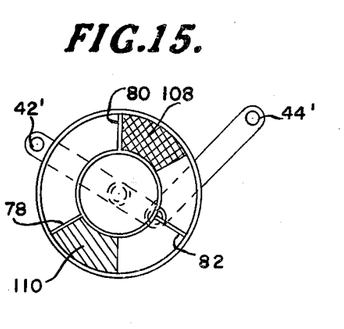
FIGURE 15 is is diagrammatic illustration of the apparatus in a fourth point of its operating cycle.
Figure 16:
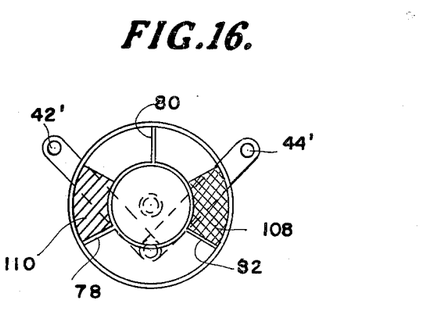
FIGURE 16 is a diagrammatic illustration of the apparatus in a fifth point of its operating cycle.
Figure 17:
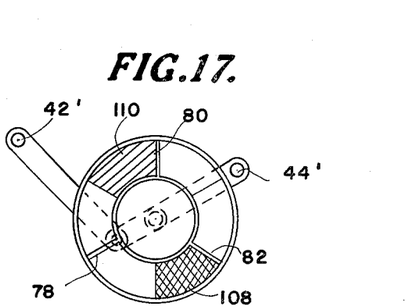
FIGURE 17 is a diagrammatic illustration of the apparatus in a sixth point of its operating cycle.

The valve 64 which rides on the top of the valve seat 70 is characterized by having, in plan view, a circular edge 94 (FIGS. 9–11 particularly), the outside diameter of which equals the outside diameter of the outer cylindrical wall 74 of the valve seat. At the center there is a circular aperture 96 equal in diameter to the inside surface of the cylindrical wall 76 of the valve seat. On the opposite side of the face 98 of the valve is a cap structure 100 which extends from a point 102 (FIG. 10) just slightly further from the center 104 than the length of the radius from the center defining the aperture 96 to another point 106 (FIG. 10) which is at a distance from the center 104 equal to the radius from the center 104 to the outer circular edge 94 of the valve. In the face 98 of the valve is a first segmental opening 108 (FIGS. 9 and 10), occupying 60° of the plan of the circular valve face 98. This is centered on the radius of the valve between center 104 and the previously mentioned point 102 which is the minimum radius of the cap. Accordingly, the opening 108 constitutes a free passage through the valve face 98. In the valve face 98 there is a second segmental opening 110, also of 60°, located diametrically opposite from opening 108. Opening 110 lies beneath cap 100, on the radius between the center 104 and the point 106 which fixes the maximum radius of the cap 100. As best seen in FIGURE 11, the cap 100 thus defines a channel or passageway between the central opening defined by aperture 96 of the valve cap and the opening 110.

Figures 9, 10:
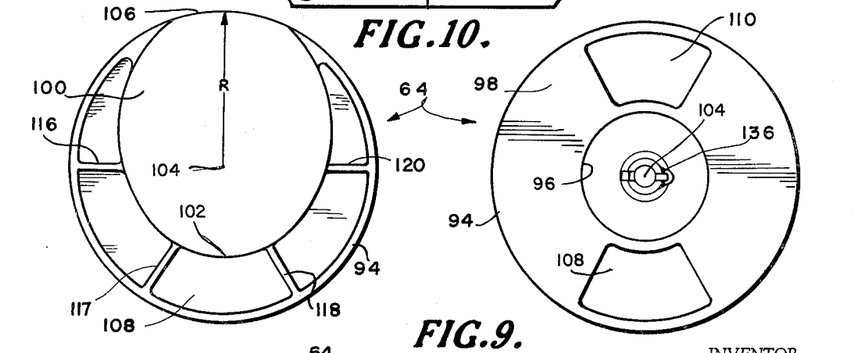
FIGURE 9 shows a bottom plan view of a valve used in the illustrative embodiment.
FIGURE 10 shows a top plan view of the valve of FIGURE 9.

The inner surface of the cap 100 is further characterized by a boss 112 having a central opening 114 therein for receiving the upper end of the valve drive shaft 62. The valve cap is further provided with strengthening ribs 116, 117, 118 and 120 (FIG. 10).

Supported from the under side of the valve plate structure 14 is a drive shaft support bracket 122 being provided with a bearing box 124 (FIGS. 2 and 7) at its lower end. The valve plate structure itself is provided with a bushing 123 (FIG. 2) wherein the drive shaft 62 is otherwise journalled for rotation within the bracket 122 and the extension 128 thereof. The bracket 122 may be fastened to the valve plate structure by use of threaded nut 130 and washer 132 (FIG. 2). At its upper end the drive shaft is provided with a transverse pin 134 (FIG. 2) extending therethrough, which pin fits into a slot 136 (FIG. 11) so as to key the valve 64 to the shaft 62 to have same rotate therewith.

The front of the casing 10 is provided with laterally protruding walls such as walls 138 and 140 (FIG. 2) which define a well or closure 142 in which the index mechanism 66 is located. This index mechanism is a conventional one, with the usual plurality of dials for showing the number of revolutions of an input shaft 144 (FIG. 2) which enters the well 142 through a fluid-tight bearing 146 in the wall of casing 10. Shaft 144 is rotated from the shaft 62 by means of a worm gear 148 operating upon a worm wheel 150 (FIGS. 2 and 7), the latter driving a shaft 152 having an offset or crank portion 154 which engages and pushes upon an offset or crank portion 156 of the index drive shaft 144. The drive of the index mechanism 66 from shaft 144 may include reduction gears 160 and 162.

Figures 1, 7A:
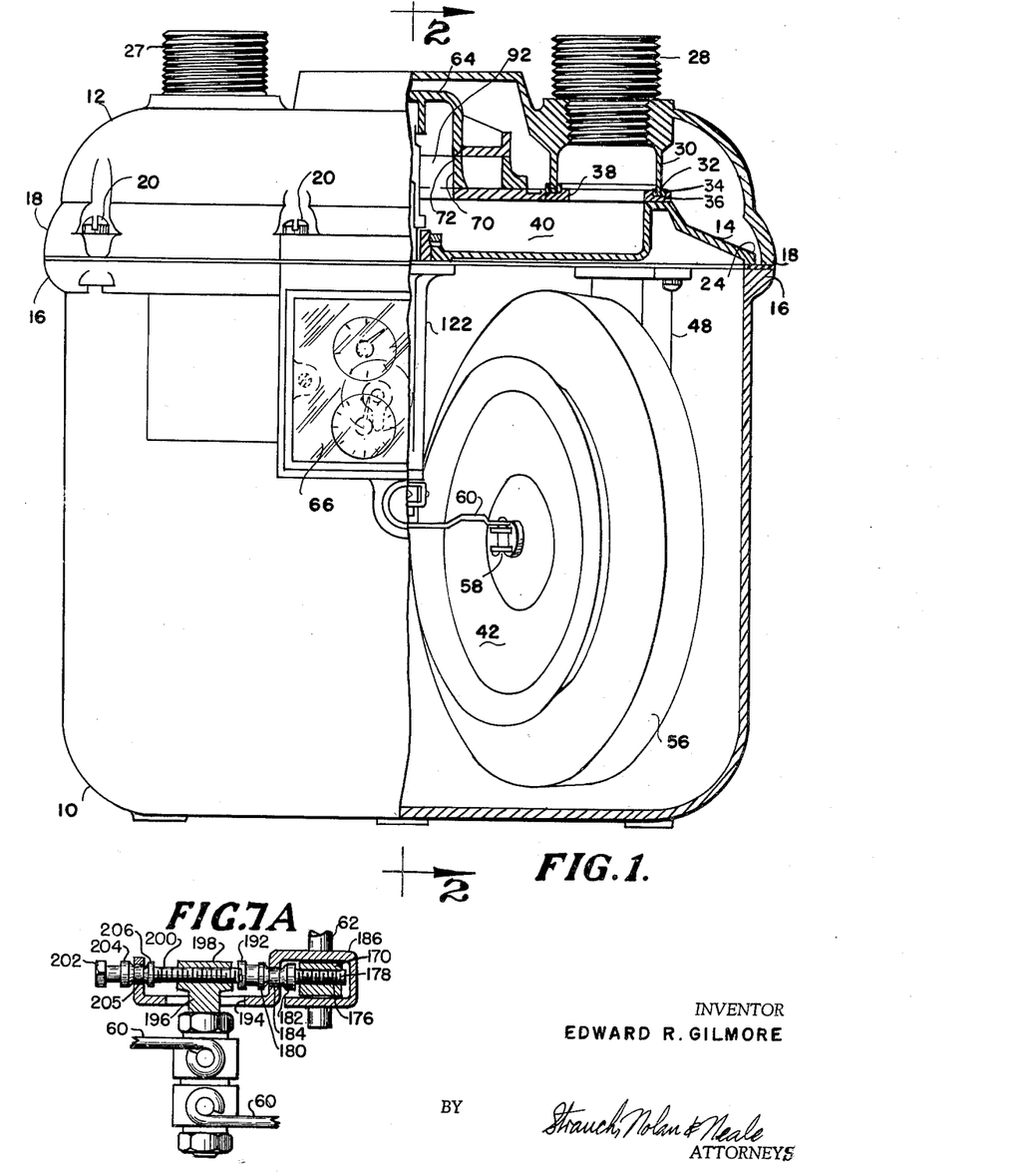
FIGURE 1 shows a front plan view of the illustrative embodiment partly broken away and in section.
FIGURE 7A is a fragmentary sectional view showing the structure for adjustment of the throw and timing of the motor crank.
Figure 7:
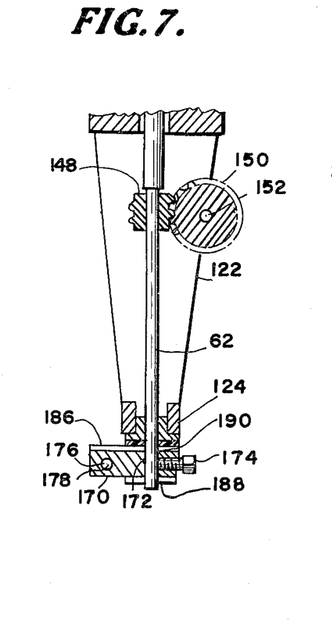
FIGURE 7 shows details of a crank shaft mounting bracket, taken substantially along the line 7—7 of FIGURE 2.
Figure 8:
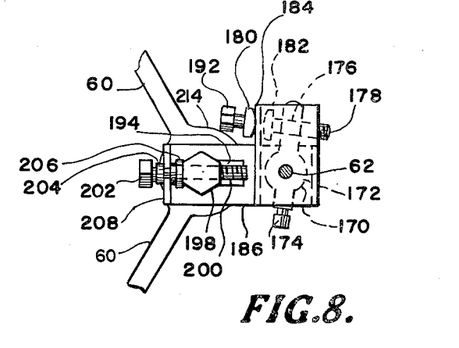
FIGURE 8 shows details of an adjustable crank throw mechanism, taken along line 8—8 of FIGURE 2.

As previously mentioned, the connecting rods 60 which extend from the respective bellows devices 42 and 44 are pivotally connected to the same crank arm which is offset from the main valve drive shaft 62. This crank arrangement is so designed as to permit adjustment of the length of the crank arm, as well as adjustment of the angular position of the crank arm with respect to the drive shaft 62, from or through an access opening 164 normally closed by a screw threaded plug 166. As will become apparent hereinafter, adjustment of the number of revolutions of drive shaft 62 and therefore index drive shaft 144 for given volumes and pressures of fluid may be had by adjustment of the length of the crank throw and its angular position on shaft 62 which drives the valve 64. These adjustments are provided for as follows, with particular reference to FIGURES 2, 5, 7 and 8: A block 170 is provided with an aperture 172 through which passes the lower end of the drive shaft 62 as shown in FIGURE 7. A set screw 174 in the block 170 fixes the block on the shaft 62. The block 170 as shown in FIGURE 7A is further provided with a threaded aperture 176 offset from shaft 62 as shown in FIGURE 8 and into which is fitted a screw threaded member 178, the latter having two opposed enlarged shoulders 180 and 182 having a length of reduced diameter therebetween which extends freely through a slot 184 (FIG. 8) in a crank arm bracket 186 which is otherwise freely rotatable as at apertures 188 and 190 (FIG. 7) about the drive shaft 62. The screw threaded member 178 is further provided with a hexagonal head 192 over which a wrench may be placed, entered through the opening 164, for turning the member 178. It should now be apparent that by rotating the member 178 it will move longitudinally with respect to the block 170. Since slot 184 in the bracket 186 is held captive between the shoulders 180 and 182 of the member 178, relative motion will therefore be established between block 170 and bracket 186 whereby the angular position of the bracket 186 with respect to the drive shaft 62 may be adjusted. Coarser adjustment may be had by use of set screw 174.

The bracket 186 is further provided with an elongated slot 194 (FIGURES 7A and 8 which proceeds in a radial direction with respect to the center of shaft 62. A crank bearing member 196 (FIGS. 2 and 5) is provided, with an enlarged head 198, through which a threaded aperture exists in which is placed a screw threaded member 200, this having a hexagonal head 202 for adjustment by a wrench also entered through opening 164 of the casing 10. Member 200 extends through slot 205 in flange 208 of bracket 186 and has opposed enlarged shoulders 204 and 206 which hold captive therebetween said flange 208 of the crank arm bracket 186. Accordingly, adjustment of the screw threaded member 200 by turning same, causes the head 198 of the crank bearing 196 to slide along the slot 194 in bracket 186 in which bearing 196 is maintained, so as to adjust the distance between the centers of drive shaft 62 and crank bearing 196. Stated otherwise, the crank throw can be thusly adjusted.

Each of the connecting rods 60 may be coupled to the crank bearing 196 by providing idler sleeves 210 on the crank bearing 196, each having a transverse pin 212 extending therefrom, about which the bifurcated ends 214 of the connecting rods 60 may be encircled. The lower end of crank bearing 196 may be threaded, and a nut 216 employed to retain the connecting rod couplings on the crank bearing 196. The crank bearing 196 may be otherwise maintained on the bracket 186 by a nut 218 which is fixed in spaced relation from head 192 so as to leave room for sliding movement of the bracket 186 therebetween.

*Operation*

The operation of the illustrative embodiment is as follows: Fluid entering through nipple 27 will sequentially be valved through port 68 into the third chamber, which is the interior of the casing 10, then through port 84 into the bellows device 44, which is the second chamber, and then through port 88 into the bellows device 42 which is the first chamber, all this by virtue of the opening 108 in the valve, which sequentially covers the ports 68, 84 and 88 in the valve seat. Meanwhile, the three chambers made up of the interior of casing 10 and the interiors of the respective bellows devices, will be valved through opening 110 in the valve and the passage beneath the cap 100 thereof to the central port 92 of the valve seat, which communicates through conduit 40 with the outlet nipple 28. Expansive and compressional forces are thus sequentially exerted upon the bellows devices 42 and 44 so as to cause rotary motion to be imparted to the drive shaft 62. Timing of the valve with respect to the bellows and their connecting rods, is established by virtue of the fact that the valve 64 is driven by the drive shaft 62. It is to be noted that the fact that the bellows devices are positioned at an angle to one another, 60° in the given embodiment, prevents any dead center stalemate condition existing insofar as the drive shaft 62 and its offset crank bearing 196 are concerned.

The valve timing with respect to the position of the bellows can be best understood with reference to FIGURES 12–17 inclusive, where the radial partition walls 78, 80 and 82 of the valve seat are shown in each figure. Also shown are connecting rods 60 reading from points here designated as 42′ and 44′, representing the points of connection with the respective bellows devices. Lines 42″ in each view show the axis of movement of the inner face 54 of the bellows device 42, and lines 44″ show the direction of movement of the inner face 54 of the bellows devices. Also shown in each of FIGURES 12–17 is a 60° segment in single cross-hatching, which represents the inlet opening 108 in the valve 64. The diametrically opposite 60° segment in double cross-hatching represents the exhaust opening 110 in the valve 64 which communicates with the central opening of the valve seat. Observance of the relative positions of the cross-hatched areas of FIGURES 12–17 with respect to the radial partition walls 78, 80 and 82 of the valve seat, explains the flow of fluid into and from the three chambers of the apparatus so as to effect the rotary motion of the drive shaft 62 (clockwise in FIGS. 12–17) and therefore the index drive shaft 144.

From the foregoing detailed description of an illustrative embodiment, it will be apparent that apparatus in accordance with the invention has many general advantages, these including the facts that all motions are rotary except the bellows or diaphragms and connecting links, there are very few arc motions, linear motions or orbiting motions, the drive from the bellows to the valve is direct, as is the drive from the bellows devices to the index mechanism. It is inherent in the illustrative embodiment that pressure is equalized across the bellows devices at four out of six measuring positions. There is no reversal of bellows movement at the start or finish of the measuring stroke of the third chamber formed by the casing 10 and the valve plate member 14 at the top. The design affords low differential with minimum pulsation throughout the operating cycle. The overall V-shape of the casing permits simplification of the mechanism. It may further be observed that adjustment of one crank changes the stroke of both of the bellows devices equally. The compact arrangement of the bellows devices at 60° to each other, within the triangular casing, will be noted.

Referring to FIGS. 18–20, a modified form of valve is shown, which may be used in substitution for the valve shown and described hereinabove and particularly detailed in FIGS. 9–11. The particular change involved is that the drive shaft 62 is terminated in a hub 250 of a spider or sprocket 252 which has arms 254, 256 and 258 which engage detents 260 placed along the inner wall here designated 96′ of the valve member. The upper end of drive shaft 62 is flattened as at 62′ to engage with a flattened area in the aperture in the hub 250 which receives the end of shaft 62. In this way the shaft 62 is keyed to rotate the spider or sprocket 252. The one flattened surface prevents erroneous positioning of the sprocket on the shaft. To prevent erroneous positioning of the valve with respect to the sprocket, at least one of the arms thereof may be spaced from the others a differing angular distance. As shown in FIG. 20, the arms 254 and 260 are approximately 130° apart.

Inspection of FIGS. 18–20 will show that during assembly, the sprocket 252 may first be firmly fixed to the shaft 62, by providing a press fit. The valve itself may then later be slipped downwardly over the sprocket, inasmuch as the detents 260 permit the ends of the sprocket arms to slide thereon. Attention is also drawn to the fact that the extreme upper end of the shaft 62 terminates beneath the lower valve surfaces which ride upon the valve seat structure.

The modified valve driving arrangements shown in FIGS. 18–20 has several advantages. The driving force is applied in the same horizontal plane with the opposing force, that is, the friction between the valve face and the valve seat, which results in a lesser tendency of the valve to lift due to foreign matter being present between the valve and the valve seat. Additionally, the driving force is applied at a greater distance from the center of rotation, as compared with the manner of driving the valve shown in FIGS. 9 and 11. Wear resulting at the point of application of the driving force thus has less effect upon the valve timing. Still further, the sprocket 252 may be removed to facilitate resurfacing of the valve seat and when the sprocket is removed the top of the drive shaft 62 is below the top surface of the valve seat.

It is to be understood that the foregoing detailed description of an illustrative embodiment of the invention has been given only to permit a complete understanding of a preferred embodiment, and the true scope of the invention is to be determined from the following appended claims.

What is claimed is:

1. A gas meter comprising a casing having a top opening, a transverse valve plate removably secured across the top of said casing and defining a first chamber within said casing; a cover removably secured substantially across the top of said casing and delimiting an enclosed valve space with said plate, means on said cover defining a gas inlet opening to said space, cooperating means on said cover and said plate defining a gas exhaust outlet connected by a passage to a valve opening in said plate, means defining two expansible and contractible gas chamber units disposed in said first chamber, conduit means communicating with and suspending said units solely from said plate to permit said units to be unitarily removable with said plate, means defining three further valve openings in said plate adjacent said first valve opening, one of said further valve openings being connected to a passage providing direct communication between said valve space and said first chamber, passage means connecting the other two of said further valve openings to said conduit means, a rotatable valve mounted on the upper side of said plate, a shaft rotatably mounted on said plate to extend into said first chamber and non-rotatably connected at its upper end to said valve, an indicator mounted in a side wall of said casing, means carried by said plate and providing a detachable connection between said indicator and said shaft, a pair of connecting rods respectively connected to said gas chamber units for displacement by expansion and contraction of said units, and a crank arm assembly connecting said rods to the lower end of said shaft in said first chamber and comprising a bracket rotatably mounted on said shaft for displacement about said shaft, a member fixed to said shaft, first screw threaded means non-rotatably securing said bracket to said member and being manipulatable to selectively vary the angular relation between said bracket and said shaft, a crank bearing member slidably mounted in a slotted portion of said bracket extending radially of said shaft, means pivotally coupling said rods to said crank bearing member for transmitting motion of said rods to rotate said bracket and said shaft, second manipulatable screw threaded means operative between said bracket and said crank bearing member for selectively shifting said bearing member along said slotted portion of said bracket to adjust the effective radial crank arm length between said crank bearing member and said shaft.

2. A gas meter comprising a casing having a top opening, a transverse valve plate removably secured across the top of said casing and defining a first chamber within said casing, a cover removably secured substantially across the top of said casing and delimiting an enclosed valve space with said plate, means on said cover defining a gas inlet opening to said space, cooperating means on said cover and said plate defining a gas exhaust outlet connected by a passage to a valve opening in said plate, means defining first and second expansible and contractible gas chamber units angularly disposed with respect to each other within said first chamber and having opposed, inner movable ends, means defining three further valve openings in said plate adjacent said first valve opening, separate first and second conduit means respectively connected to and fixedly supporting the outer ends each of said first and second chamber units from said plate, said first and second conduit means respectively providing fluid communication between the interior of said first and second units and respective ones of two of said further valve openings, the remaining one of said further valve opening being connected to a passage providing direct communication between said valve space and said first chamber, a shaft rotatably mounted on said plate to extend into said first chamber, a valve mounted on the upper end of said shaft for rotation therewith to control the flow of fluid through said valve openings, an indicator mounted in the side wall of said casing, means carried by said plate and providing a detachable connection between said indicator and said shaft, a crank arm assembly connected to the lower end of said shaft for rotation therewith, a pair of connecting rods respectively connecting the inner movable ends of said gas chamber units with said crank arm assembly to cause rotation of said crank arm assembly and said shaft upon cyclic expansion and contraction of said gas chamber units, said valve plate, valve, first and second gas chamber units, shaft crank arm assembly, connecting rods, and first and second conduit means providing a unitary structure that is removable from said casing as a unit.

3. The gas meter defined in claim 1 comprising means providing a removably covered hole in the side of said casing for providing access to said first and second screw threaded means.

4. The gas meter defined in claim 2 comprising a mounting member having a hub non-rotatably and slidably receiving the upper end of said shaft and arms formed rigid with said hub and extending radially therefrom in angularly spaced apart relationship to each other, said valve having a socket receiving said mounting member, and means defining in said socket inwardly opening, longitudinal channels slidably receiving the outer ends of said arms.

References Cited by the Examiner

UNITED STATES PATENTS

| | | | |
|---|---|---|---|
| 1,432,809 | 10/22 | Tolhurst | 73—267 |
| 2,005,024 | 6/35 | Diehl | 73—266 |
| 2,145,340 | 1/39 | Bujnowski | 73—265 |
| 2,932,198 | 4/60 | Whitworth | 73—267 |
| 3,004,430 | 10/61 | Whitworth | 73—263 |

FOREIGN PATENTS

| | | |
|---|---|---|
| 383,717 | 10/23 | Germany. |
| 545,636 | 6/42 | Great Britain. |

RICHARD C. QUEISSER, *Primary Examiner.*

ROBERT EVANS, JOSEPH P. STRIZAK, *Examiner.*